Nov. 27, 1962 H. M. STERN 3,065,905

RANDOM ACCESS STORAGE DEVICE FOR CARDS

Filed Dec. 8, 1958 2 Sheets-Sheet 1

INVENTOR.
HANS M. STERN
BY Hazard & Miller
ATTORNEYS

RANDOM ACCESS STORAGE DEVICE FOR CARDS

Filed Dec. 8, 1958

INVENTOR.
HANS M. STERN
BY Hazard & Miller
ATTORNEYS

United States Patent Office 3,065,905
Patented Nov. 27, 1962

3,065,905

RANDOM ACCESS STORAGE DEVICE FOR CARDS

Hans M. Stern, Culver City, Calif. (Via T. Morgagni 3, Milan, Italy)

Filed Dec. 8, 1958, Ser. No. 778,816
2 Claims. (Cl. 235—61.11)

This invention relates to a random access memory system and is particularly adapted for use with stacks of data bearing cards to be examined by an electronic computer and wherein data may not only be taken from said cards by the computer but added to certain cards appropriately selected by the computer.

At present the storing and retrieving or the addition of information is taken care of by such means as punched cards, magnetic drums, core memories and magnetic tapes. Punched cards have a low volumetric efficiency and are handled at low speeds. Magnetic drums are fast but have limited storage capacity. Core memories are rather expensive and magnetic tapes require considerable access time. The present invention has as its general object to provide fast random access memory to be utilized with electronic computers. In providing such means the data cards may be in the form of magnetic recordings, punched holes, printed marks or other suitable media. The cards are stored in a file or storage means consisting of a number of compartments, each containing a stack of data cards which can be removed from storage, subjected to reading, and/or recording under the control of an electronic computer and retrieved in a stack by or for the storage device in a very short time.

The above and other objects will be more apparent from the following specification in connection with the accompanying drawings.

Figure 1:
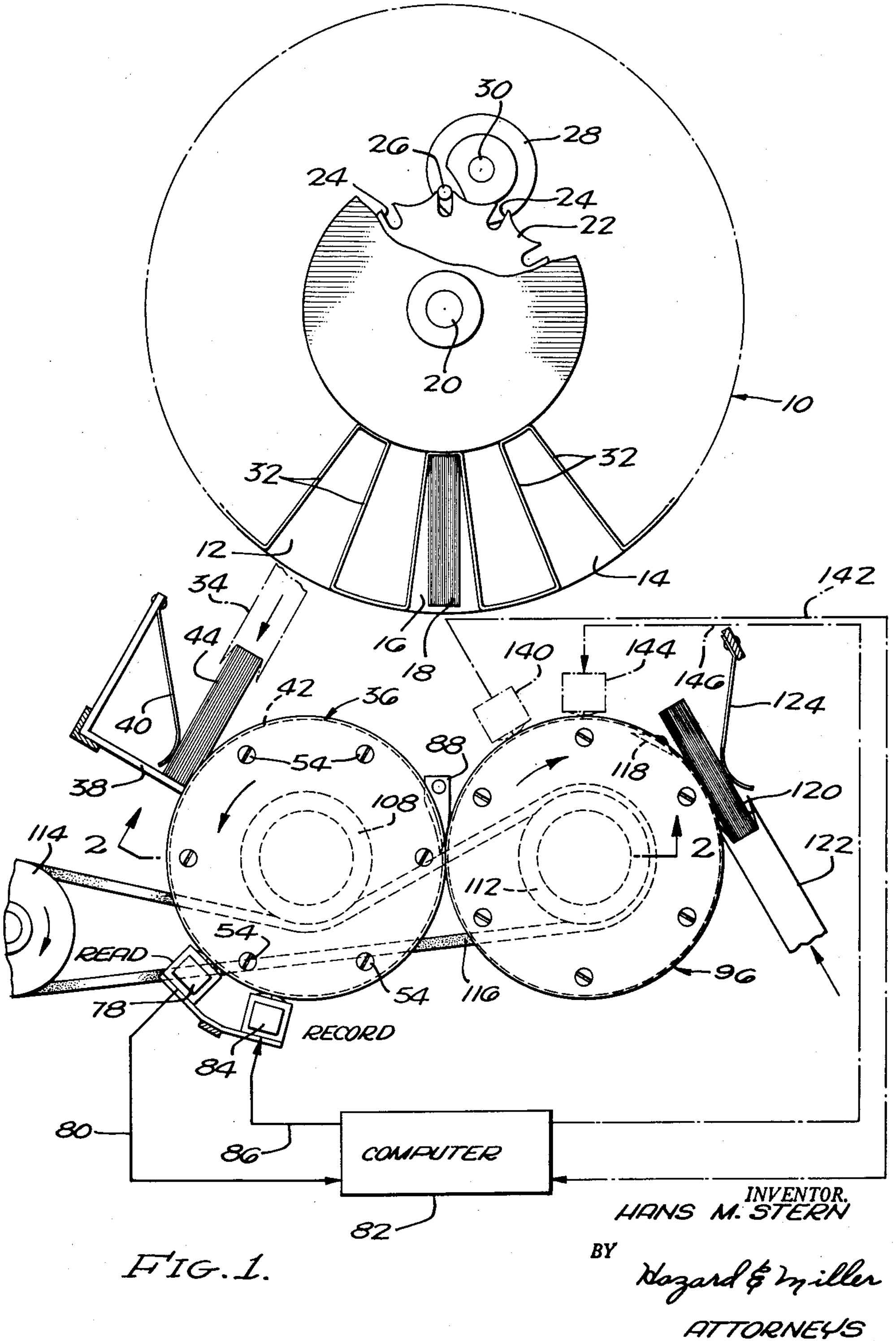
FIG. 1 is a partially diagrammatic plan view of the system.

In FIG. 1 there is shown a storage device 10 which may be in the form of a circular rotary member having empty card stack receiving pockets 12 and 14 and an intermediate pocket 16 having a stack of cards 18 therein. The rotary storage compartment 10 is mounted for rotation opon a shaft 20. Interconnecting the shaft 20 and the storage device 10 is a Geneva gear 22 having the usual notches 24 and an actuator therefor comprising a pin 26 on a disc 28, said disc being mounted for rotation with an auxiliary shaft 30.

The card stack compartments 12, 14 and 16 have side walls 32 which are not as high as the cards themselves, and just above said side walls 32 is mounted a reciprocating card stack impeller 34 which is adapted to move radially outwardly as shown in FIG. 1 to push a stack of cards from the compartment 12 to a point adjacent a card pick-up drum 36. As shown in FIG. 1 the stack is held in position by a retaining bracket 38 and a follower spring 40 which yieldably urges the stack toward the circumferential or side wall 42 of said drum 36. When the stack 44 is projected to the position indicated in FIG. 1, the card nearest the drum 36 will engage the circumferential drum wall 42. The drum 36 is illustrated as being in three sections 46, 48 and 50 which are separated by spacers 52 and held together by suitable studs 54.

The spacers 52 provide apertures about the circumference of the drum 36 which communicates with the hollow interior of the drum indicated at 56 and said hollow interior communicates with a hollow shaft 58, the latter being adapted for connection with a conduit 60 leading to a suction pump (not shown). Consequently, when a card is brought in contact with the circumferential pick-up drum wall 42 it will be removed from the stack 44 and carried about the drum in a counterclockwise direction as indicated by the arrow in FIG. 1.

The drum 36 and its shaft 58 are supported by bearing assemblies 62 and 64 in a casing 66 having cut-out side wall portions 68 and 70. The hollow shaft 58 has a lower section 72 to which the conduit 60 is secured. This section 72 is stationary since it is connected to the stationary mounting 66 by means of studs 74. Furthermore, there is a tongue and groove seal indicated generally at 76 between the lower end of the rotary upper portion of the hollow shaft 58 and its stationary lower portion 72.

As a card is carried by the pick-up drum 36 in a counterclockwise direction, it substantially conforms to the circumferential wall 42 of said drum. It progresses with the drum and goes beneath an electromagnetic pick-up or reading device 78 which is connected by an electrical connection 80 to an electronic computer 82, it being preferred that the data on the cards of the several stacks in the storage compartment 10, and including the cards of the stack 44, be recorded on the cards electromagnetically.

Continuing the rotation of the pick-up drum 36 in a counter-clockwise direction, the first card from the stack 44 will encounter an electromagnetic recording device 84 connected electrically at 86 to the computer 82.

It should be noted that the drum 36 has circumferential flanges **42*a* which keep the cards properly aligned on the circumferential wall of the drum so that they will be properly positioned relative to the magnetic pick-up or reading device 78 and the magnetic recording device 84**.

It should be noted here that the specific type of computer is not considered to be a part of this invention but one which can reject a data card as being an inappropriate card for the problem being worked out by the computer, or the pick-up device can feed desired information to the computer and the latter can, when desired, record additional data on the card through the recording device 84.

As the pick-up drum 36 continues its counter-clockwise rotation with the lead card from the stack 44, the card will encounter a transfer element 88 which is mounted upon a suitable stationary support and which extends into one of the grooves 90 which provide the air inlets about the circumference of the drum 36. This is better illustrated in FIG. 3.

Closely adjacent the pick-up drum 36 is a transfer drum 96 which is substantially the same in structure as the pick-up drum 36 with its bearings and air connection.

When a card reaches the transfer element 88, it will be pulled away from the circumferential wall 42 of the pick-up drum 36 and directed to the circumferential wall 94 of a transfer drum 96. The drum 96 is approximately the same construction as drum 36, it also being split into three sections 98, 100 and 102 which are spaced apart by separators 104. It has apertures 106 which comprise air inlet apertures, as the apertures 90 in drum 36. Furthermore, it has the supporting structure and bearing elements as is the case in drum 36 and its accompanying structure.

The hollow shaft 58 supporting drum 36 carries a pulley 108 and drum 96 has a hollow shaft 110 upon which is mounted a pulley 112. As viewed in FIG. 1 there is a power pulley 114 driven by suitable means such as an electric motor. There is a drive belt 116 which lies about the drive pulley 114, contacts the pick-up drum pulley 108 and extends around the transfer pulley 112 in the manner shown in FIG. 1, so that drum 36 will, as described, rotate in a counter-clockwise direction and drum 96 will rotate in a clockwise direction, as indicated by the arrows.

When a data card has been released from a drum 36 by the transfer element 88, it will be picked up by the transfer drum 96 and moved in a counter-clockwise direction until it is engaged by a take-off element 118, which as shown in FIG. 1 extends into the drum 96, being positioned in one of the air inlet apertures 106. The data cards will feed into a mouth 120 of a card stack return device 122 and they are held in stacked position by a leaf spring 124. The card stack return element 122 can be moved in a linear direction to re-deposit the stack originally removed from the storage compartment 12 to the position 14 of said storage compartment 12.

Suitable timing means (not shown) can be utilized to shift the rotary card storage magazine 10 a distance which is the same as that between successive card storage compartments 12 and 16. Thus, when the compartment 12, shown at the left of FIG. 1, is emptied of its card stack 44 said compartment 12 will move to the position 14 of the same compartment to again receive the same card stack. Furthermore, it should be understood that the computer includes selector means whereby any compartments, such as 12 or 16, can be brought into position for feeding the stack of cards into operative relationship with the pickup drum 36.

Figures 2, 3, 4, 5:
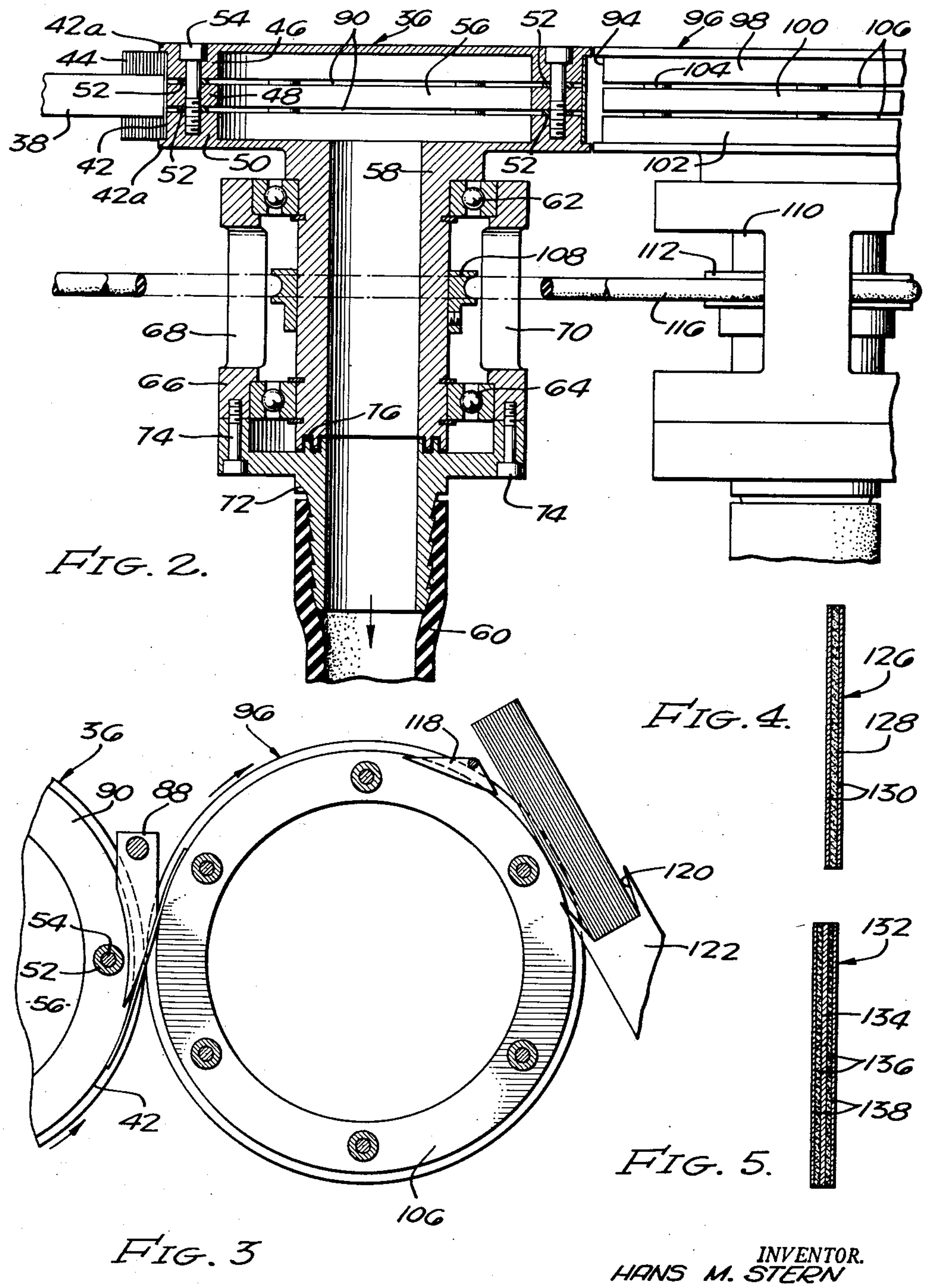
FIG. 2 is an enlarged sectional view taken approximately on the line 2—2 of FIG. 1.
FIG. 3 is a horizontal sectional view through the transfer drum, illustrating the card transfer element and take-off device.
FIG. 4 is a vertical sectional view through a data card having a single data receiving surface.
FIG. 5 is a vertical sectional view through a modified form of data card having two data receiving surfaces.

In FIG. 4 there is shown a data card 126 having a central layer of magnetizable material 128 with outer protective coatings 130. This is a card adapted to receive data at one side only.

In FIG. 5 there is shown a data card 132 having a central non-magnetic layer 134 having at each side thereof magnetic layers 136 and outer non-magnetic protective coatings 138. The card 132 is adapted to receive data applied preferably by electromagnetic means on both sides of the card.

When a card such as the double magnetic card 132 of FIG. 5 is used, I provide an electromagnetic reading or data pick-up device 140 having electrical connection means 142 with the computer 82. Also there is a recording or data writing device 144 connected at 146 with the computer 82.

From the foregoing it will be seen that I have provided a random access memory system, and more specifically, data card handling means to permit the cards to be examined and/or provided with additional data. It is fast in operation, relatively inexpensive and compact, since the storage magazine 10 can hold a great number of cards carrying a considerable amount of data. The transfer mechanism and reading and recording arrangements, in combination with the storage magazine 10, are adapted to be used with suitable timing mechanism for shifting the storage magazine and also adapted for use with a selective system which can bring any particular card storage compartment, 12 or 16, into position for feeding to the pick-up drum 36. Furthermore, the apparatus is arranged in such a manner that a double sided card, such as shown in FIG. 5, can be utilized and the data on each side can be read or supplemented by the computer in a single passage of the card in its movement about the pick-up drum 36 and the transfer drum 96.

It should be understood that various changes can be made in the form, details, arrangement and preparation of the various parts without departing from the spirit of the invention.

I claim:

1. A random access memory system comprising a data card storage magazine for cards having recorded data incorporated herewith and having a plurality of multiple card storage compartments movable to a discharge point, means for ejecting a card from a compartment located at said discharge point, essentially two card transport drums, one of said drums comprising a rotary card pick-up drum adjacent said discharge point and having its side wall positioned to engage the card, means incorporated in said drum and its side wall for holding the card against the side wall to move the card from the discharge point as the drum rotates, an electronic computer, a recorded data reading device located to read data on a card on said drum, said reading device being electrically connected to said electronic computer, an electrically actuated data recording device connected to said electronic computer to record data from said computer upon said card, the other of said two transport drums comprising a transfer drum adjacent said pickup drum, the two drums being oppositely rotatable, a card return device adjacent a peripheral portion of the transfer drum and having means for successively receiving transfer cards from the transfer drum, said card return device being movable to return collected cards to selected compartments in said card storage magazine.

2. A random access memory system comprising a rotary data card storage magazine having a plurality of radially disposed, circumferentially accessible storage compartments, there being a separate compartment for processing, means for rotating said magazine, means for stopping the magazine and a selected compartment thereof at a discharge station, a pair of individual card transport drums including a pick-up drum and a transfer drum, both drums being disposed adjacent the circumference of said magazine, discharge station means adjacent said pick-up drum and located radially outwardly of said magazine and of a size to receive the entire stack of cards from a compartment located at the discharge station, means for transferring the entire stack of cards from the selected magazine compartment to the discharge station means, the side wall of the pick-up drum being positioned to engage the most adjacent card in the discharge station, means incorporated in the pick-up drum for holding the most adjacent card against its side wall in substantial conformity with the curvature of the side wall, an electronic computer a recorded data reading device located to read data on a card on said pick-up drum, said reading device being electrically connected to said electronic computer, said transfer drum being positioned adjacent said pick-up drum and having means associated therewith for successively receiving cards from the pick-up drum, a card stack return station spaced circumferentially about the magazine from the discharge station and having means for successively receiving cards from the transfer drum to accumulate them in their original stacked condition, and means at said return station movable radially inwardly toward the magazine for moving the restacked cards from the discharge station radially inwardly into the storage magazine.

References Cited in the file of this patent

UNITED STATES PATENTS

| | | |
|---|---|---|
| 2,640,647 | Rand | June 2, 1953 |
| 2,692,729 | Guttridge et al. | Oct. 26, 1954 |
| 2,752,154 | Nelson | June 26, 1956 |
| 2,833,475 | Dedek | May 6, 1958 |
| 2,905,466 | Azari et al. | Sept. 22, 1959 |
| 2,936,113 | Clark et al. | May 10, 1960 |
| 3,024,982 | Algier et al. | Mar. 13, 1962 |